United States Patent
Li et al.

(10) Patent No.: US 12,216,629 B2
(45) Date of Patent: Feb. 4, 2025

(54) DATA PROCESSING METHOD AND APPARATUS, COMPUTERREADABLE MEDIUM, AND ELECTRONIC DEVICE

(71) Applicant: TENCENT TECHNOLOGY (SHENZHEN) COMPANY LIMITED, Shenzhen (CN)

(72) Inventors: Xiaosen Li, Shenzhen (CN); Jie Xu, Shenzhen (CN); Wen Ouyang, Shenzhen (CN); Yangyu Tao, Shenzhen (CN); Pin Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 23 days.

(21) Appl. No.: 17/964,778

(22) Filed: Oct. 12, 2022

(65) Prior Publication Data
US 2023/0033019 A1    Feb. 2, 2023

Related U.S. Application Data

(63) Continuation of application No. PCT/CN2021/132221, filed on Nov. 23, 2021.

(30) Foreign Application Priority Data

Dec. 31, 2020    (CN) .......................... 202011626906.6

(51) Int. Cl.
   *G06F 16/22*    (2019.01)
   *G06F 16/901*    (2019.01)
   *G06Q 50/00*    (2012.01)
(52) U.S. Cl.
   CPC .......... *G06F 16/22* (2019.01); *G06F 16/9024* (2019.01); *G06Q 50/01* (2013.01)

(58) Field of Classification Search
   CPC ...... G06F 16/22; G06F 16/9024; G06Q 50/01
   See application file for complete search history.

(56) References Cited

U.S. PATENT DOCUMENTS

| 1,163,803 | A | * | 12/1915 | Bickford | ............... | F16D 41/088 |
| | | | | | | 192/44 |
| 9,336,388 | B2 | * | 5/2016 | Brdiczka | ............... | G06F 21/552 |

(Continued)

FOREIGN PATENT DOCUMENTS

| CN | 106126341 A | 11/2016 |
| CN | 108965141 A | 12/2018 |

(Continued)

OTHER PUBLICATIONS

The World Intellectual Property Organization (WIPO) International Search Report for PCT/CN2021/132221 Mar. 1, 2022 6 Pages (including translation).

(Continued)

*Primary Examiner* — Daniel A Kuddus
(74) *Attorney, Agent, or Firm* — ANOVA LAW GROUP PLLC

(57) ABSTRACT

This application belongs to the technical field of artificial intelligence, and particularly relates to a data processing method, a data processing apparatus, a computer-readable medium, and an electronic device. The method includes acquiring a relationship graph network, the relationship graph network comprising nodes for representing interacting objects and edges for representing interactive relationships between multiple interacting objects; performing core degree mining on the relationship graph network through a device cluster comprising multiple computing devices, and iteratively updating node core degrees of all or some of the nodes in the relationship graph network; pruning the relationship graph network according to the node core degrees to remove some of the nodes and edges in the relationship (Continued)

graph network; and compressing the device cluster to remove some of the computing devices in the device cluster, when a network scale of the relationship graph network satisfies a network compression condition.

19 Claims, 9 Drawing Sheets

(56) References Cited

U.S. PATENT DOCUMENTS

| | | | | |
|---|---|---|---|---|
| 9,542,503 | B2* | 1/2017 | Franceschini | G06N 7/01 |
| 9,917,739 | B2* | 3/2018 | Levchuk | H04L 41/14 |
| 10,728,105 | B2* | 7/2020 | Rossi | G06N 20/20 |
| 11,575,693 | B1* | 2/2023 | Muddu | G06F 40/134 |
| 11,671,436 | B1* | 6/2023 | Xu | G06F 18/24 |
| | | | | 726/22 |
| 2011/0188405 | A1* | 8/2011 | Mukherjea | H04L 45/14 |
| | | | | 370/254 |
| 2014/0165195 | A1* | 6/2014 | Brdiczka | G06F 21/552 |
| | | | | 726/23 |
| 2014/0317033 | A1* | 10/2014 | Mojsilovic | G06Q 10/00 |
| | | | | 706/17 |
| 2014/0365503 | A1* | 12/2014 | Franceschini | G06N 7/01 |
| | | | | 707/758 |
| 2016/0127195 | A1* | 5/2016 | Ripley | G06Q 10/067 |
| | | | | 709/224 |
| 2017/0063909 | A1* | 3/2017 | Muddu | H04L 63/20 |
| 2018/0103052 | A1* | 4/2018 | Choudhury | H04L 63/20 |
| 2019/0179615 | A1* | 6/2019 | Liu | G06F 16/9024 |
| 2023/0177798 | A1* | 6/2023 | Griffin | G06V 10/764 |
| | | | | 382/159 |

FOREIGN PATENT DOCUMENTS

| | | |
|---|---|---|
| CN | 113515672 A | 10/2021 |
| EP | 4206943 A1 * | 5/2023 |
| JP | 2008181333 A | 8/2008 |
| WO | WO2021022017 A1 * | 2/2021 |

OTHER PUBLICATIONS

A.B. Kahn, "Topological Sorting of Large Networks", 1962, p. 558-562, Communications of the ACM.

Malliaros F D et al. "The core decomposition of networks: Theory, algorithms and applications", 2019, The VLDB Journal, Springer.

The Japan Patent Office (JPO) Notification of Reasons for Refusal for Application No. 2023-521789 and Translation Mar. 11, 2024 6 Pages.

Hiroaki Shiokawa et al., "Accelerating Large-Scale Graph Clustering by Incremental Aggregation of Nodes." 4th Forum on Data Engineering and Information Management (DEIM2012), B6-1 (2012).

* cited by examiner

DATA PROCESSING METHOD AND APPARATUS, COMPUTERREADABLE MEDIUM, AND ELECTRONIC DEVICE

RELATED APPLICATIONS

This application is a continuation of PCT Application No. PCT/CN2021/132221, filed on Nov. 23, 2021, which in turn claims priority to Chinese Patent Application No. 2020116269066, entitled "DATA PROCESSING METHOD AND APPARATUS, COMPUTER-READABLE MEDIUM, AND ELECTRONIC DEVICE" and filed with the China National Intellectual Property Administration on Dec. 31, 2020. The two applications are both incorporated herein by reference in their entirety.

FIELD OF THE TECHNOLOGY

This application relates to the field of artificial intelligence technologies, and in particular, to a data processing technology.

BACKGROUND OF THE DISCLOSURE

With the development of computer and network technologies, various interactive relationships may be established between users based on services provided by network platforms. For example, a user may establish a social relationship with another user on a social networking platform. Accordingly, network platform may collect a large amount of user data, including data generated when users use the network platform and related to attributes of the users as well as interactive data generated by establishment of interactive relationships between different users.

By reasonable collation and mining of user data, a network platform may summarize user characteristics and further provide convenient and efficient platform service for users in combination with the user characteristics. However, with the continuous accumulation of user data, an increasing data scale may increase the data processing pressure, and the network platform needs more and more computing resources and time to perform user data analysis processing operations. Therefore, how to improve the big data analysis efficiency and the reduce the related cost is a problem urgent to be solved.

SUMMARY

Embodiments of this application provide a data processing method, a data processing apparatus, a computer-readable medium, an electronic device, and a computer program product, which may solve the technical problems of high computing resource consumption, low data processing efficiency, etc., in big data analysis to some extents.

Other features and advantages of this application become obvious through the following detailed descriptions, or may be partially learned partially through the practice of this application.

One aspect of this application provides a data processing method performed by an electronic device. The method includes acquiring a relationship graph network, the relationship graph network comprising nodes for representing interacting objects and edges for representing interactive relationships between multiple interacting objects: performing core degree mining on the relationship graph network through a device cluster comprising multiple computing devices, and iteratively updating node core degrees of all or some of the nodes in the relationship graph network; pruning the relationship graph network according to the node core degrees to remove some of the nodes and edges in the relationship graph network; and compressing the device cluster to remove some of the computing devices in the device cluster, when a network scale of the relationship graph network satisfies a network compression condition.

Another aspect of this application provides a non-transitory computer-readable storage medium, storing a computer program, the computer program, when executed by a processor, implementing the data processing method in the foregoing technical solutions.

Another aspect of this application provides an electronic device, including a processor; and a memory, configured to store executable instructions of the processor, the processor being configured to perform the data processing method in the foregoing technical solutions by executing the executable instructions.

In embodiments consistent with the present disclosure, a relationship graph network is established according to data involving interactive relationships between interacting objects, and distributed computing may be performed first through a device cluster by using a structural feature and sparsity of the relationship graph network for regional core degree mining. With the continuous iterative updating of node core degrees, a pruning process is performed on the relationship graph network to prune away nodes that have converged and corresponding connecting edges, to continuously compressing the relationship graph network with the iterative updating of the node core degrees and reducing the consumption of computing resources. Accordingly, a compression process may further be performed on the device cluster for core degree mining when the relationship graph network is compressed to a proper size. Therefore, not only may computing resources be released, but also the additional time cost in data distribution, etc., caused by parallel computing may be reduced, and the data processing efficiency may be improved.

It is to be understood that the foregoing general descriptions and the following detailed descriptions are merely for illustration and explanation purposes and are not intended to limit this application.

BRIEF DESCRIPTION OF THE DRAWINGS

Accompanying drawings herein are incorporated into and constitute a part of this specification, show embodiments that conform to this application, and are used together with this specification to describe the principle of this application. Obviously, the accompanying drawings in the following descriptions are merely some embodiments, and a person of ordinary skill in the art may further obtain other accompanying drawings according to the accompanying drawings without creative efforts.

DESCRIPTION OF EMBODIMENTS

Exemplary implementations are now described more comprehensively with reference to the accompanying drawings. However, the exemplary implementations can be implemented in various forms and are not to be understood as being limited to the examples described herein. Conversely, the implementations are provided to make this application more comprehensive and complete, and comprehensively convey the idea of the examples of the implementations to a person skilled in the art.

In addition, the described features, structures, or characteristics may be combined in one or more embodiments in any appropriate manner. In the following descriptions, more specific details are provided to provide a comprehensive understanding of some embodiments. However, a person skilled in the art is to be aware that, the technical solutions in this application may be implemented without one or more of the specific details, or another method, unit, apparatus, or step may be used. In other cases, well-known methods, apparatuses, implementations, or operations are not shown or described in detail, to avoid obscuring aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, the execution order may change according to a specific embodiment.

Figure 1:
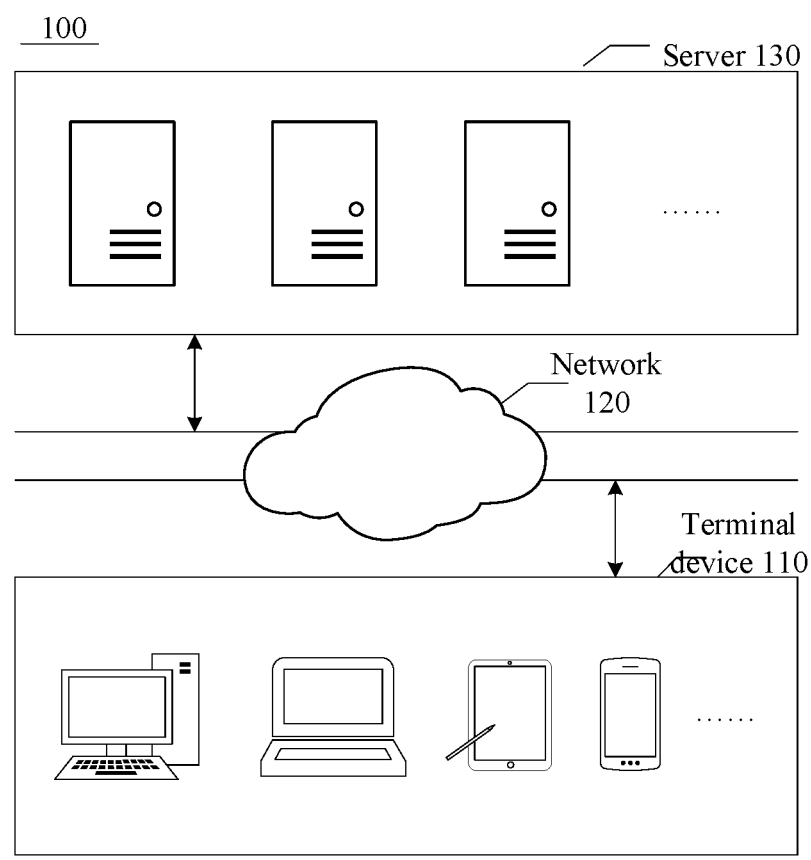
FIG. 1 is an architectural block diagram of a data processing system according to one embodiment.

FIG. 1 is an architectural block diagram of a data processing system that the technical solution of this application is applicable to.

As shown in FIG. 1, a data processing system 100 may include a terminal device 110, a network 120, and a server 130.

The terminal device 110 may include various electronic devices such as a smartphone, a tablet computer, a notebook computer, a desktop computer, a smart speaker, a smart watch, smart glasses, and an in-vehicle terminal. The terminal device 110 may be installed with various application clients, such as a video application client, a music application client, a social application client, and a payment application client, such that a user may use corresponding application service based on the application clients.

The server 130 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The network 120 may be a communication medium of various connection types capable of providing a communication link, such as a wired communication link or a wireless communication link, between the terminal device 110 and the server 130.

According to implementation requirements, the system architecture in this embodiment may include any quantities of terminal devices, networks, and servers. For example, the server 130 may be a server group including a plurality of server devices. In addition, the technical solution provided in some embodiments is applicable to the terminal device 110 or the server 130, or may be implemented by the terminal device 110 and the server 130 together. No special limits are made thereto in this application.

For example, when using a social application on the terminal device 110, the user may transmit information with another user on a social networking platform, or conduct a social networking behavior such as voice conversation and video conversation. Accordingly, the user may establish a social relationship with the other user, and in addition, corresponding social network user data may be generated on the social networking platform.

In some embodiments, after related user data such as social network user data is collected, a graph network model may be constructed based on interactive relationships corresponding to the user data, and data mining is performed on the graph network model to obtain social activity attributes of users in the interactive relationships. Taking a social networking use scenario as an example, in a graph network model for reflecting transaction relationships between users and their followers, a node represents a user, and an edge represents that there is a follower/friend relationship between two nodes. Generally, a user node may be at a central position of the network. A core degree (core value) of the node may be input to a downstream machine learning task as a topological feature to implement a activity model mining task to recognize whether the node in the graph network model is a user or a follower. In addition, in risk control of social interactions, data mining may be performed based on the graph network model to detect whether there is an unusual interaction behavior for a certain node (or edge), to execute detection tasks of unusual interaction behaviors such as stalking, harassment and the like.

In order to improve the big data analysis and mining efficiency, a cloud technology may be used for distributed computing in some embodiments.

The cloud technology is a hosting technology that unifies a series of resources such as hardware, software, and networks in a wide area network or a local area network to implement computing, storage, processing, and sharing of data. The cloud technology relates to a network technology, an information technology, an integration technology, a management platform technology, an application technology, and the like of an application of a cloud computing business mode, and may form a resource pool, which is used as required, and is flexible and convenient. A backend service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

Cloud computing is a computing mode, in which computing tasks are distributed in a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid for according to usage.

A basic capability provider of cloud computing may construct a cloud computing resource pool (referred to as a cloud platform for short, generally referred to as infrastructure as a service (IaaS)) platform may be constructed, where multiple types of virtual resources are deployed for external clients to select and use. The cloud computing resource pool mainly includes: a computing device (a virtual machine, including an operating system), a storage device, and a network device.

According to logical functions, a platform as a service (PaaS) platform may be deployed on an IaaS layer, and then a software as a service (Saas) layer is deployed on the PaaS layer. Alternatively, the SaaS layer may be directly deployed on the IaaS layer. PaaS is a platform where software runs, such as a database and a web container. SaaS is various business software, such as a web portal and a mass texting device. Generally speaking, SaaS and PaaS are upper layers relative to IaaS.

Big data refers to a data set that may not be captured, managed, and processed by use of a conventional software tool within a certain time range, and a novel processing mode more powerful in decision-making, insight discovery, and process optimization is needed to process such massive, high-growth-rate, and diversified information assets (i.e., big data). With the advent of the cloud era, big data has attracted more and more attention. Special technologies are needed to process a large amount of big data effectively. Technologies suitable for big data include a massively parallel processing database, data mining, a distributed file system, a distributed database, a cloud computing platform, the Internet, and a scalable storage system.

Artificial intelligence (AI) cloud service is generally also referred to as an AI as a service (AIaaS). It is a current mainstream service mode of an artificial intelligence platform. Specifically, the AIaaS platform may split several types of common AI service, and provide independent or packed service at a cloud. Such a service mode is akin to opening an AI-themed store: all developers may access and use, through application programming interfaces (APIs), one or more types of artificial intelligence service provided by the platform, and part of senior developers may also use an AI framework and AI infrastructure provided by the platform to deploy, operate, and maintain their dedicated artificial intelligence cloud service.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study design principles and implementation methods of various intelligent machines, so that the machines have the functions of perception, reasoning, and decision-making.

AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and mechatronics. AI software technologies mainly include a computer vision technology, a speech processing technology, a natural language processing (NLP) technology, machine learning (ML)/deep learning, and the like.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

Technical solutions of a data processing method, data processing apparatus, computer-readable medium, electronic device, computer program product, etc., provided in some embodiments will now be described in detail in combination with specific implementations.

Figure 2:
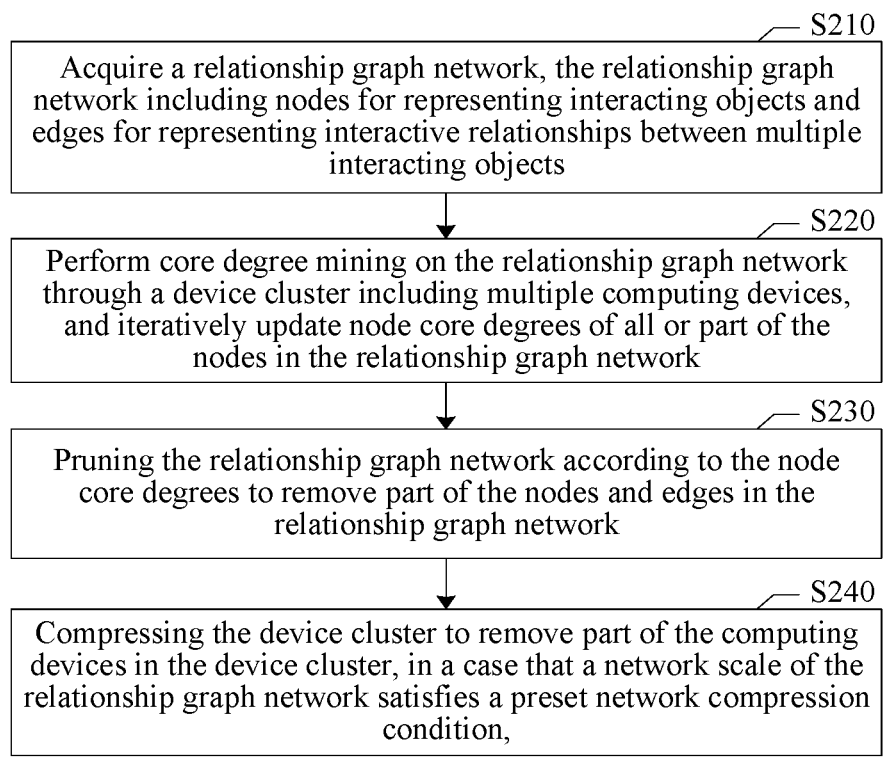
FIG. 2 is a flowchart of a data processing method according to one embodiment.

FIG. 2 is a flowchart of a data processing method according to one embodiment. The data processing method may be performed by an electronic device. For example, the method may be performed on the terminal device 110 shown in FIG. 1 or on the server 130 shown in FIG. 1, or may be performed by the terminal device 110 and the server 130 together. As shown in FIG. 2, the data processing method may mainly include the following steps S210 to S240.

Step S210: Acquire a relationship graph network, the relationship graph network including nodes for representing interacting objects and edges for representing interactive relationships between multiple interacting objects.

Step S220: Perform core degree mining on the relationship graph network through a device cluster including multiple computing devices, and update node core degrees of all or part of the nodes in the relationship graph network iteratively.

Step S230: Perform a pruning process on the relationship graph network according to the node core degrees to remove part of the nodes and edges in the relationship graph network.

Step S240: Perform, when a network scale of the relationship graph network satisfies a preset network compression condition, a compression process on the device cluster to remove part of the computing devices in the device cluster.

In the data processing method provided in this embodiment, a relationship graph network is established according to social network data, data, or user data involving interactive relationships between interacting objects, and distributed computing may be performed first through a device cluster by use of a structural feature and sparsity of the relationship graph network for regional core degree mining. With the continuous iterative updating of node core degrees, a pruning process is performed on the relationship graph network to prune away nodes that have converged and corresponding connecting edges, to continuously compressing the relationship graph network with the iterative updating of the node core degrees and reducing the consumption of computing resources. Accordingly, a compression process may further be performed on the device cluster for core degree mining when the relationship graph network is compressed to a proper size. Therefore, not only may computing resources be released, but also the additional time cost in data distribution, etc., caused by parallel computing may be reduced, and the data processing efficiency may be improved.

Each method step of the data processing method in the above embodiment will now be described in detail.

Step S210: Acquire a relationship graph network, the relationship graph network including nodes for representing interacting objects and edges for representing interactive relationships between multiple interacting objects.

The interaction object may be a user object that performs a user interaction on a social network platform. For example, in an online interaction scenario involving a gifting transaction, the interacting objects may include a user initiating an online gift and a friend receiving the gift, and an interactive relationship between the interacting objects is an online transaction relationship established between the user and the friend based on the gifting event.

In this embodiment, data generated in social contacts between multiple interacting objects is collected, and then the multiple interacting objects and interactive relationships between these interacting objects may be extracted, to establish a relationship graph network including nodes and edges. Each node may represent an interaction object. An edge connecting two nodes represents the interactive relationship between the interacting objects corresponding to the two nodes respectively.

Step S220: Perform core degree mining on the relationship graph network through a device cluster including multiple computing devices, and update node core degrees of all or part of the nodes in the relationship graph network iteratively.

The node core degree is a parameter for measuring importance of each node in the graph network. In this embodiment, coreness of each node determined by k-core decomposition of the graph network may be used to represent the node core degree of the node. k-core of a graph refers to a subgraph remaining after the operation of removing nodes whose degrees are less than or equal to k is repeated. A degree of a node is equal to the number of neighbor nodes directly adjacent to this node. Generally speaking, a degree of a node may reflect importance of this node in a local region of the graph network to some extents, and coreness of the node may be mined to measure the importance of the node better within a global scope.

If a node exists in k-core but not in (k+1)-core, coreness of this node is k. k-core mining is an algorithm for calculating coreness of all nodes in the graph network. For example, an original graph network is a 0-core graph. 1-core is a graph remaining after all isolated nodes are removed from the graph network. 2-core is a graph remaining after nodes whose degrees are less than 2 are removed first from the graph network, then nodes whose degrees are less than 2 are removed from the remaining graph, and so on, until there are no nodes whose degrees are less than 2. 3-core is a graph remaining after nodes whose degrees are less than 3 are removed first from the graph network, then nodes whose degrees are less than 3 are removed from the remaining graph, and so on, until there are no nodes whose degrees are less than 3. Coreness of a node is defined as an order of a maximum core where this node is located. For example, if a node exists at most in 5-core but not in 6-core, coreness of this node is 5.

Figure 3:
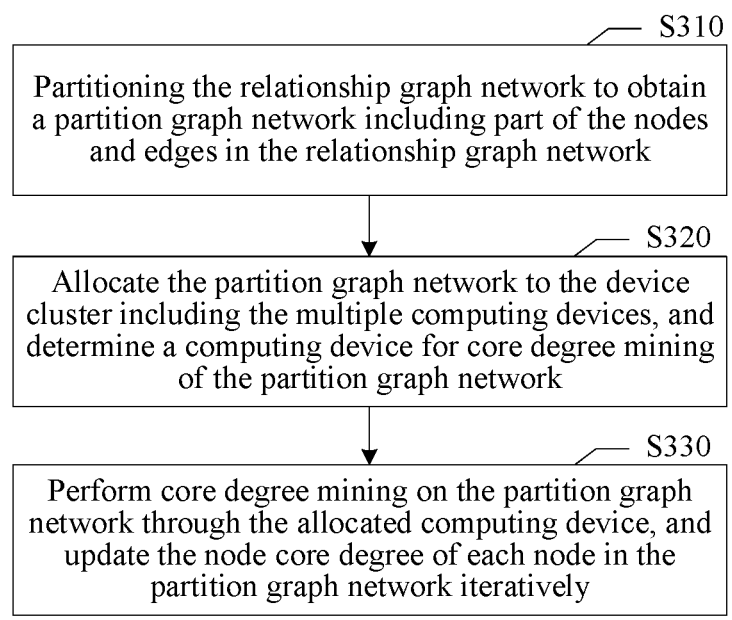
FIG. 3 is a flowchart of a method for core degree mining based on distributed computing according to one embodiment.

FIG. 3 is a flowchart of a method for core degree mining based on distributed computing according to one embodiment. As shown in FIG. 3, based on the above embodiment, the operation in step S220 of performing core degree mining on the relationship graph network through a device cluster including multiple computing devices and updating node core degrees of all or part of the nodes in the relationship graph network iteratively may include the following steps S310 to S330.

Step S310: Perform a partitioning process on the relationship graph network to obtain a partition graph network including part of the nodes and edges in the relationship graph network.

A relationship graph network of a relatively large network scale may be partitioned into multiple partition graph network of relatively small scales. In one embodiment, the partitioning process may be performed on the relationship graph network by the following method: selecting multiple partitioning center points first from the relationship graph network according to a preset partition count: then, performing a clustering process on all the nodes in the relationship graph network taking the partitioning center points as clustering centers, to allocate each node to the closest partitioning center point; and finally, partitioning the relationship graph network into multiple partition graph networks according to a clustering result of the nodes. The partitioning center point may be a node selected according to a preset rule or randomly in the relationship graph network.

In one embodiment, there may be a certain overlapping region between two adjacent partition graph networks, and the two partition graph networks may share part of nodes and edges in the overlapping region, to generate a certain computing redundancy. Therefore, the reliability of core degree mining for each partition graph network is improved.

Step S320: Allocate the partition graph network to the device cluster including the multiple computing devices, and determine a computing device for core degree mining of the partition graph network.

The multiple partition graph networks are allocated to different computing devices respectively, so that distributed computing for core degree mining may be implemented through the device cluster including the computing devices. Therefore, the data processing efficiency is improved.

In one embodiment, when the partitioning process is performed on the relationship graph network, the relationship graph network may be partitioned into a corresponding number of partition graph networks according to the number of available computing devices in the device cluster. For example, if the device cluster for distributed computing includes M computing devices, the relationship graph network may be correspondingly partitioned into M partition graph networks.

In another embodiment, the relationship graph network may be partitioned into a plurality of partition graph networks of close scales according to a computing capability of a single computing device, and then each partition graph network is allocated to the same number of computing devices. For example, if the relationship graph network includes N nodes, the relationship graph network may be partitioned into N/T partition graph networks, where T is a node number of a single partition graph network that is determined according to the computing capability of a single computing device and may be processed by the computing device. When the scale of the relationship graph network is relatively large, and the number of the partition graph networks is relatively large, the number of nodes in each partition graph network is substantially equal to the node number. After the relationship graph network is partitioned, N/T computing devices are selected from the device cluster, and a partition graph network is allocated to each computing device. When there are less than N/T devices in the device cluster, multiple partition graph networks may be allocated to part or all of the computing devices according to computing capabilities and working states of the computing devices.

Step S330: Perform core degree mining on the partition graph network through the allocated computing device, and update the node core degree of each node in the partition graph network iteratively.

In one embodiment, the node core degree of each node in the relationship graph network may be initially assigned first according to a preset rule, and then the node core degree of each node is updated iteratively in each iteration round.

In some embodiments, the node core degree is initialized according to a degree of the node. Specifically, for each node in the relationship graph network, a node number of neighbor nodes adjacent to the node is acquired, and then for each node, the node core degree of the node is initialized according to the node number of the neighbor nodes adjacent to the node. The degree of the node represents the node number of the neighbor nodes adjacent to this node. In some other implementations, weight information may be determined in combination with an attribute of the node, and then the node core degree is initially assigned according to both the degree of the node and the weight information.

Figure 4:
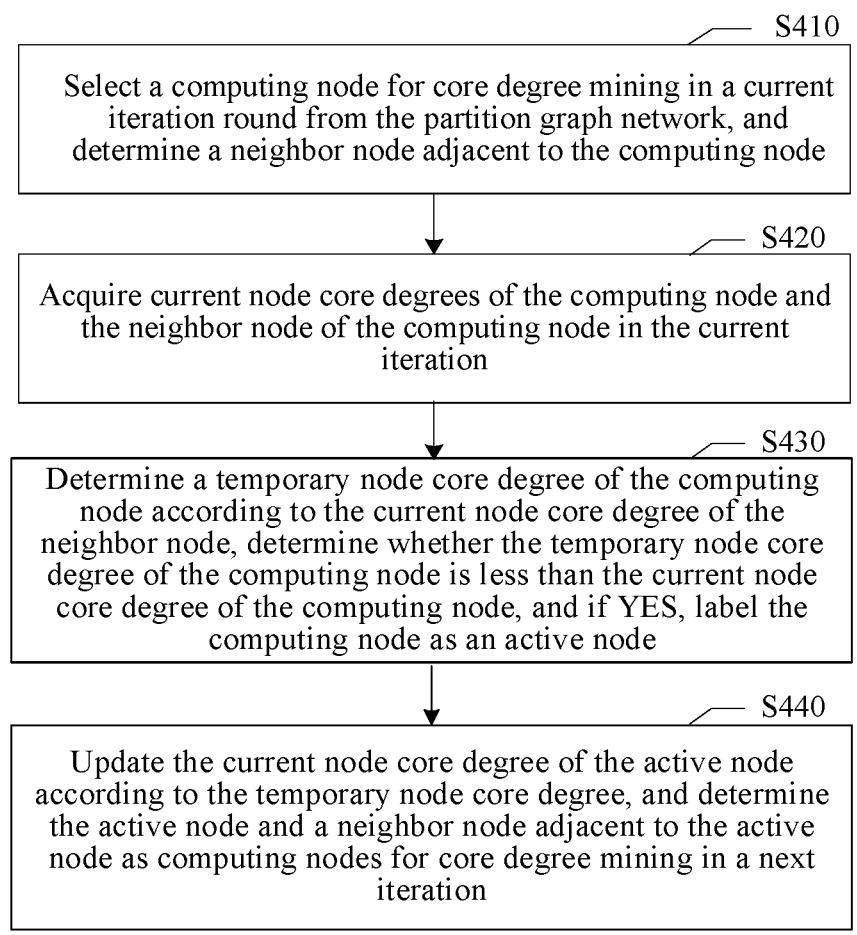
FIG. 4 is a flowchart of performing core degree mining on a partition graph network according to one embodiment.

FIG. 4 is a flowchart of performing core degree mining on a partition graph network according to one embodiment. As shown in FIG. 4, based on the above embodiment, the operation in step S330 of performing core degree mining on the partition graph network and updating the node core degree of each node in the partition graph network iteratively may include the following steps S410 to S440.

Step S410: Select a computing node for core degree mining in a current iteration round from the partition graph network, and determine a neighbor node adjacent to the computing node.

In a first iteration round after the node core degrees are initially assigned, all the nodes in the partition graph network may be determined as computing nodes. The computing node is a node requiring core degree mining computing in the current iteration round. Whether to update the node core degree of each node may be determined according to a mining result.

In each iteration round for core degree mining, computing nodes requiring core degree mining in the current iteration round may be determined according to a core degree mining result and node core degree updating result of a previous iteration round, and the node core degrees of part or all of these computing nodes are to be updated in the current iteration round. For the other nodes except the computing nodes, core degree mining is not performed in the current iteration round, and certainly, the node core degrees are not updated.

In this embodiment, a neighbor node is another node directly connected with a node. Since the node core degree of each node may be affected by its neighbor node, as iteration continues, a node whose node core degree is not updated in the current iteration round may also be selected as a computing node in subsequent iteration.

Figure 5:
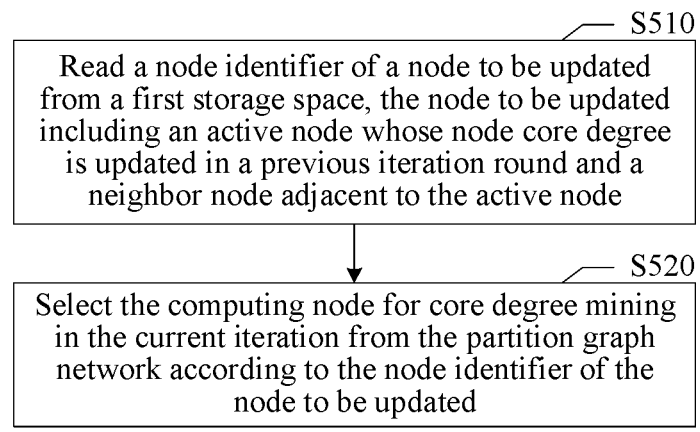
FIG. 5 is a flowchart of selecting a computing node according to one embodiment.

FIG. 5 is a flowchart of selecting a computing node according to one embodiment. As shown in FIG. 5, the operation in step S410 of selecting a computing node for core degree mining in a current iteration round from the partition graph network may include the following steps S510 to S520.

Step S510: Read a node identifier of a node to be updated from a first storage space, the node to be updated including an active node whose node core degree is updated in a previous iteration round and a neighbor node adjacent to the active node.

The partition graph networks forming the relationship graph network are processed on different computing devices in a distributed manner, while marginal regions of two adjacent partition graph networks may include nodes that are originally adjacent to each other in the relationship graph network, whose node core degrees may be affected by each other. Therefore, to maintain the synchrony and consistency of node core degree updating in each partition graph network in the process of distributed computing, in this embodiment, a first storage space is allocated in the system to store node identifiers of all nodes to be updated in the relationship graph network.

In an iteration round, when the node core degree of a node in a certain partition graph network is updated according to the core degree mining result, the node is labeled as an active node. The active node and a neighbor node of the active node are determined as nodes to be updated whose node identifiers are written to the first storage space.

Step S520: Select the computing node for core degree mining in the current iteration round from the partition graph network according to the node identifier of the node to be updated.

When an iteration round starts, each computing device may read a node identifier of a node to be updated from the first storage space, and further, a computing node for core degree mining in the current iteration round may be selected from the partition graph network allocated to the computing device according to the read node identifier of the node to be updated.

By performing the above steps S510 to S520, node identifiers of all nodes to be updated in the relationship graph network may be summarized through the first storage space after each iteration round ends, and the node identifiers of all the nodes to be updated are distributed to different computing devices when a new iteration round starts, such that the computing devices select computing nodes from the partition graph networks maintained by them.

Step S420: Acquire current node core degrees of the computing node and the neighbor node of the computing node in the current iteration round.

In this embodiment, the node core degrees of the nodes may be monitored and updated according to the core degree mining result in each iteration round. A current node core degree of each node in the current iteration round is a latest node core degree determined in a previous iteration round.

In this embodiment, a second storage space may be allocated in the system to store the node core degrees of all the nodes in the relationship graph network. A computing device that needs to perform core degree mining and updating according to existing core degree data may read the current node core degrees of the computing node and its neighbor node in the current iteration round from the second storage space.

Step S430: Determine a temporary node core degree of the computing node according to the current node core degree of the neighbor node, determine whether the temporary node core degree of the computing node is less than the current node core degree of the computing node, and if YES, label the computing node as an active node.

Taking the core degree being coreness as an example, in the related art of this application, core degree mining may be performed on the relationship graph network by a recursive pruning method based on the definition of k-core. Specifically, nodes whose degrees are less than or equal to k and connecting edges thereof may be continuously removed from the graph from k=1, until the degrees of all the nodes in the remaining graph are greater than k. Recursive pruning is like "peeling an onion", and core values of all the nodes peeled in a kth round are k. However, the coreness is computed in this method by gradually compressing the whole graph network from outside in, so data of the whole graph network may only be processed serially by centralized computing in this method, and distributed parallel processing is hardly applicable. As a result, this method has the problems of excessive computing time, poor computing performance, etc., in the face of a relationship graph network of a very large scale (order of magnitude of 10 billion/100 billion).

In order to solve the problems, in one embodiment, core degree mining may be performed by h-index-based iteration. Specifically, in this embodiment, an h-index of the computing node may be determined according to the current node core degree of the neighbor node, and the h-index is determined as the temporary node core degree of the computing node, the h-index being used for representing that current node core degrees of at most h of all neighbor nodes of the computing node are greater than or equal to h.

For example, a certain computing node has five neighbor nodes whose current node core degrees are 2, 3, 4, 5, and 6 respectively. According to a sequence from small to large node core degrees, the five neighbor nodes of the computing node include five neighbor nodes whose current node core degrees are greater than or equal to 1, five neighbor nodes whose current node core degrees are greater than or equal to 2, four neighbor nodes whose current node core degrees are greater than or equal to 3, three neighbor nodes whose current node core degrees are greater than or equal to 4, two neighbor nodes whose current node core degrees are greater than or equal to 5, and one neighbor node whose current node core degree is greater than or equal to 6. It can be seen that all the neighbor nodes of the computing node include at most three neighbor nodes whose current node core degrees are greater than or equal to 3. Therefore, an h-index of the computing node is 3, and further, a temporary node core degree of the computing node may be determined to be 3.

Figure 6:
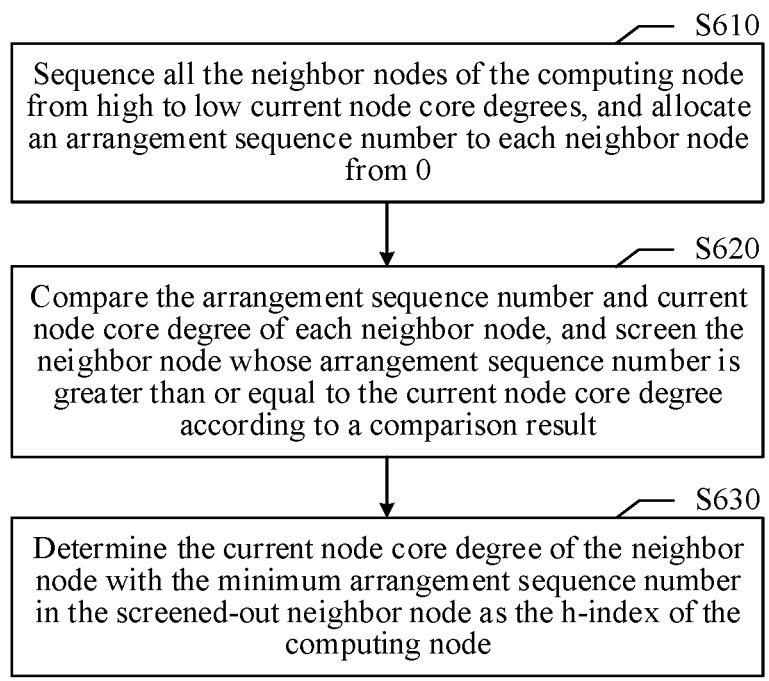
FIG. 6 is a flowchart of determining an h-index of a computing node according to one embodiment.

FIG. 6 is a flowchart of determining an h-index of a computing node according to one embodiment. As shown in FIG. 6, based on the above embodiment, a method for determining the h-index of the computing node according to the current node core degree of the neighbor node may include the following steps S610 to S630.

Step S610: Sequence all the neighbor nodes of the computing node from high to low current node core degrees, and allocate an arrangement sequence number to each neighbor node from 0.

Step S620: Compare the arrangement sequence number and current node core degree of each neighbor node, and screen out the neighbor node whose arrangement sequence number is greater than or equal to the current node core degree according to a comparison result.

Step S630: Determine the current node core degree of the neighbor node with the minimum arrangement sequence number in the screened-out neighbor node as the h-index of the computing node.

In this embodiment, the h-index of the computing node may be determined rapidly and efficiently by sequencing and screening. This method is particularly suitable for the condition that there are many computing nodes.

Step S440: Update the current node core degree of the active node according to the temporary node core degree, and determine the active node and a neighbor node adjacent to the active node as computing nodes for core degree mining in a next iteration round.

After the temporary node core degree of the active node is acquired, a numerical value of the temporary node core degree of the active node may be compared with that of the current node core degree of the active node. If the temporary node core degree is less than the current node core degree, the current node core degree may be replaced with the temporary node core degree. If they are the same, it indicates that the computing node needs not to be updated in the current iteration round.

In one embodiment, after the current node core degree of the active node is updated according to the temporary node core degree, an overall updating result of the relationship graph network may be obtained by summarization according to a node core degree updating results of each partition graph network to further lay a foundation for core degree mining in a next iteration round.

Figure 7:
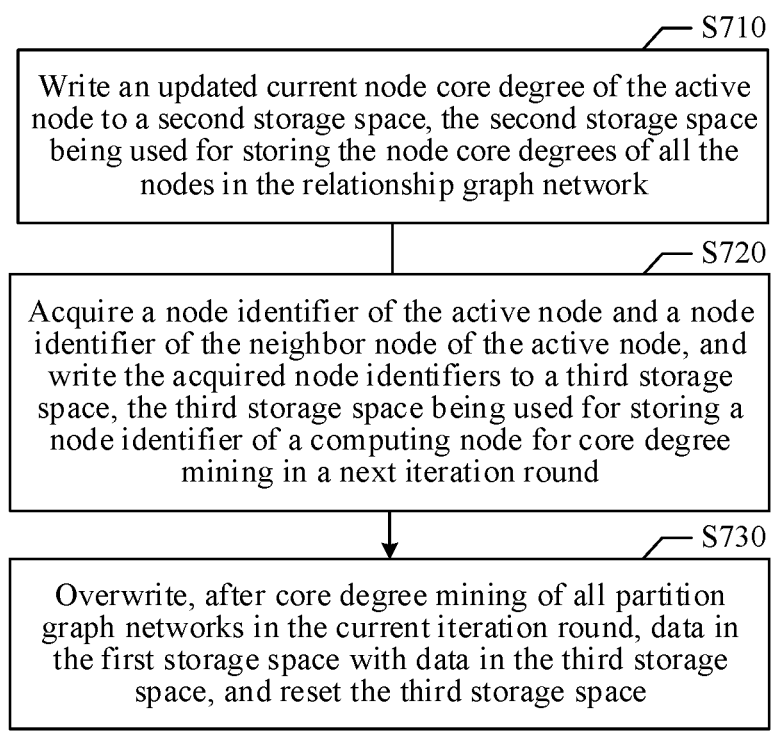
FIG. 7 is a flowchart of summarizing a node core degree mining result of a partition graph network according to one embodiment.

FIG. 7 is a flowchart of summarizing a node core degree mining result of a partition graph network according to one embodiment. As shown in FIG. 7, based on the above embodiment, a method for summarizing the node core degree mining result of each partition graph network may include the following steps S710 to S730.

Step S710: Write an updated current node core degree of the active node to a second storage space, the second storage space being used for storing the node core degrees of all the nodes in the relationship graph network.

Step S720: Acquire a node identifier of the active node and a node identifier of the neighbor node of the active node, and write the acquired node identifiers to a third storage space, the third storage space being used for storing a node identifier of a computing node for core degree mining in a next iteration round.

Step S730: Overwrite, after core degree mining of all partition graph networks in the current iteration round, data in the first storage space with data in the third storage space, and reset the third storage space.

In this embodiment, a third storage space is configured, and the node core degree mining results of the partition graph networks are summarized and distributed based on the updating and resetting of the third storage space in each iteration round. Therefore, the data processing stability and reliability are ensured on the basis of improving the data processing efficiency by distributed computing.

Step S230: Perform a pruning process on the relationship graph network according to the node core degrees to remove part of the nodes and edges in the relationship graph network.

As the node core degrees are mined and iteratively updated, the nodes and edges in the relationship graph network may gradually be convergent and stable, and may not affect the core degree mining results of the other nodes, and their node core degrees may not be updated in subsequent iteration. This part of convergent nodes may be pruned away, to reduce data scales of the relationship graph network and the partition graph network.

In this embodiment, a minimum core degree of an active node in a current iteration round and a minimum core degree of the active node in a previous iteration round may be acquired. A convergent node in the relationship graph network is according to the minimum core degree of the active node in the previous iteration round when the minimum core degree of the active node in the current iteration round is greater than that of the active node in the previous iteration round, the convergent node being a node whose node core degree is less than or equal to the minimum core degree of the active node in the previous iteration round. The convergent node and an edge connected with the convergent node are removed from the relationship graph network.

Figure 8:
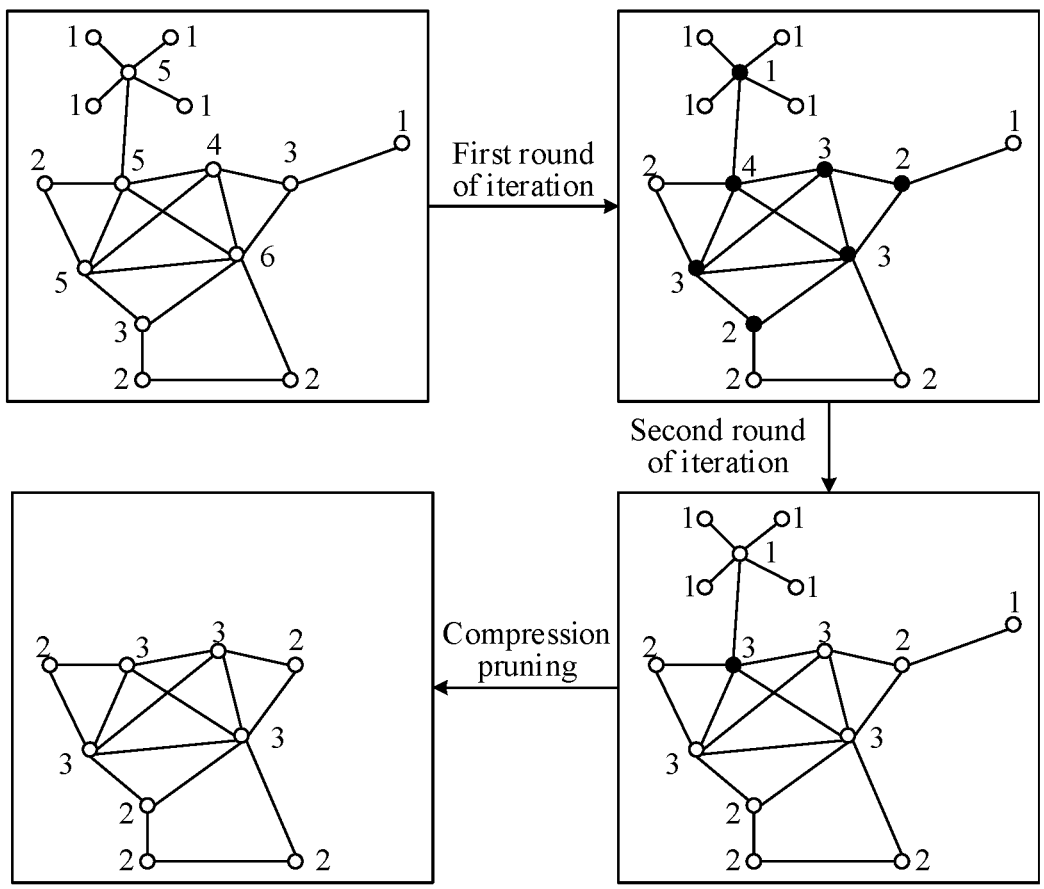
FIG. 8 is a schematic diagram of a process of performing compression pruning on a relationship graph network based on iterative updating of node core degrees according to one embodiment.

FIG. 8 is a schematic diagram of a process of performing compression pruning on a relationship graph network based on iterative updating of node core degrees according to one embodiment.

The key to compression pruning is analyzing core value changes of the nodes in each iteration round. $C_v^{(t)}$ represents a core value of node v in a $t^{th}$ iteration round, and $minCore^{(t)}$ represents a minimum core value of a node whose core value is updated in the $t^{th}$ iteration round.

$$minCore^{(t)} = min\ C_v^{(t)}\{v|C_v^{(t)} < C_v^{(t-1)}\}$$

When a core value of a node is updated, an updated core value is less than the original core value. According to a rule that a core value of a node decreases progressively in each iteration round, when $minCore^{(t)} > minCore^{(t-1)}$, it indicates that all nodes whose core values are less than or equal to $minCore^{(t-1)}$ have converged at this time and may not be updated later. According to a k-core mining feature, a node with a relatively small core value does not affect the iteration of a node with a relatively large core value. Therefore, convergent nodes and their corresponding connecting edges may be "pruned away" in each iteration round to gradually compress the relationship graph network as the iteration progresses.

As shown in FIG. 8, an initial minimum core value may be determined to be $minCore^{(0)}=1$ according to an initial core value. After a first iteration round, core values of a part of nodes are updated, and in this part of nodes whose core values are updated, the minimum core value is $minCore^{(1)}=1$. After a second iteration round, core values of another part of nodes are updated, and in this part of nodes whose core values are updated, the minimum core is $minCore^{(2)}=1$.

Since $minCore^{(2)} > minCore^{(1)}$, a pruning process on the relationship graph network may be triggered to remove the nodes whose core values are 1. As such, the relationship graph network is compressed.

Step S240: Perform, when a network scale of the relationship graph network satisfies a preset network compression condition, a compression process on the device cluster to remove part of the computing devices in the device cluster.

With the continuous compression of the network scale of the relationship graph network, computing resources needed by node core degree mining of the relationship graph network are gradually reduced. In such case, part of computing resources may be released as the iteration progresses, to reduce the resource cost.

In one embodiment, the network compression condition may include that a number of the edges in the relationship graph network is less than a preset number threshold. The compression process may be performed on the device cluster in a manner of repartitioning the relationship graph network according to the network scale of the relationship graph network subjected to the pruning process to obtain a smaller number of partition graph networks, and invoking a relatively small number of computing devices based on the reduced number of the partition graph networks.

In one embodiment, when the network scale of the compressed relationship graph network satisfies a certain condition, a computing device may be selected from the device cluster as a target device for standalone computing of the relationship graph network, and the other computing devices except the target device are removed from the device cluster. As such, a distributed computing mode based on multiple computing devices may be transformed to a centralized computing mode based on a single computing device.

Although the steps of the method in some embodiments are described in a specific order in the accompanying drawings, this does not require or imply that the steps have to be performed in the specific order, or all the steps shown have to be performed to achieve an expected result. Additionally, or alternatively, some steps may be omitted, a plurality of steps may be combined into one step, and/or one step may be decomposed into a plurality of steps for execution, and the like.

Based on the introduction to the data processing method in the above embodiment, the data processing method provided in some embodiments involve a compression-pruning-based k-core mining method. In some embodiments, this method may be performed based on the iterative updating of h-indexes, and graph network compression pruning may be performed automatically when a specified condition is satisfied. A process of the data processing method provided in some embodiments in an application scenario may include the following steps.

In (1), a core value of each node v in a relationship graph network G (V, E) is initialized with a node degree, $C_v^{(0)}=deg(v)$, where deg (v) represents the node degree, i.e., the number of neighbor nodes of the node. minCore is initialized with a minimum node core, namely $minCore^{(0)}=min\ C_v^{(0)}$.

In (2), a numMsgs parameter is set to represent the number of nodes whose core values change in each iteration round, and numMsgs is initialized to 0.

In (3), for each node in G (V, E), an h-index (i.e., h-index value) is computed according to the core value of its neighbor node as a core value $C_v^{(t)}$ in a current iteration round, $C_v^{(t)}=max\ h\{(C_j^{(t-1)} \geq h)|i \in N(v)\}$, where N(v) represents a neighbor node set of the node v. When $C_v^{(t)} < C_v^{(t-1)}$, the core value of this node is updated, numMsgs is increased by 1, and meanwhile, a minimum core value $minCore^{(t)}$ of the nodes updated in the current round is computed, $minCore^{(t)} = min\ C_v^{(t)}\{v|C_v^{(t)} < C_v^{(t-1)}\}$.

In (4), whether numMsgs is 0 is determined. When numMsgs is 0, it indicates that the core values of all the nodes are no longer updated, and iteration is stopped. Otherwise, step (5) is performed.

In (5), whether $minCore^{(t)} > minCore^{(t-1)}$ is true is determined. If YES, a compression pruning policy is performed: the nodes whose core values are less than or equal to $minCore^{(t-1)}$ and the corresponding core values are stored, and these nodes and corresponding connecting edges are removed from the iterated graph G(V, E) to obtain a compressed subgraph G'(V, E); and the iteration of steps 3 to 5 continues to be performed on G'(V, E). When $minCore^{(t)} > minCore^{(t-1)}$ is not true, the iteration of steps 3 to 5 continues to be performed on the original graph.

For k-core mining of a large-scale graph network, the above-mentioned iteration steps are performed first in a distributed parallel computing manner. When the scale of the compressed subgraph G'(V, E) satisfies a specified condition (for example, the number of edges is less than 30 million), distributed computing may be transformed to a standalone computing mode. The standalone computing mode may not only release computing resources but also reduce additional time cost in data distribution, etc., caused by parallel computing. Particularly for a graph network with a long-chain structure, iteration is usually concentrated on the updating of long-chain nodes at a later stage, and the standalone computing node is more suitable for such case.

The k-core mining algorithm in this embodiment may implement distributed computing on a Spark on Angel platform. Spark is a fast universal computing engine specially designed for massive data processing, and Angel is a high-performance distributed machine learning platform designed and developed based on the concept of parameter server (PS). The Spark on Angel platform is a high-performance distributed computing platform integrating a powerful parameter server function of Angel and a massive data processing capability of Spark, which supports conventional machine learning, deep learning, and various graph algorithms.

Figure 9:
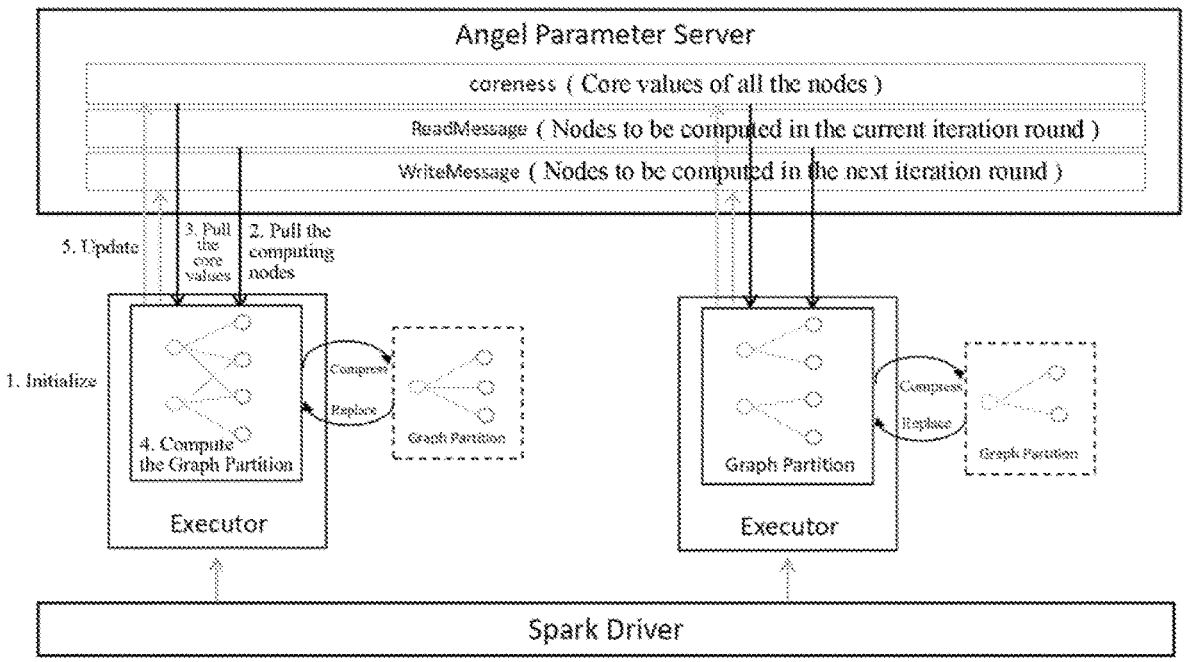
FIG. 9 is an overall architecture and processing flowchart of k-core mining in an application scenario according to one embodiment.

FIG. 9 is an overall architecture and processing flowchart of k-core mining in an application scenario according to an embodiment of this application. As shown in FIG. 9, driven by a spark driver, each executor is responsible for storing adjacency list partition data (i.e., network data of a partition graph network GraphPartition), computing h-index values, and performing a compression pruning operation, and an angel parameter server is responsible for storing and updating core values of the nodes, i.e., coreness vectors in FIG. 9. In order to accelerate iterative convergence by use of the sparsity of k-core mining, nodes that need to be computed in a current iteration round and a next iteration round may be stored on the PS, i.e., the ReadMessage vector and WriteMessage vector in FIG. 9 respectively. A node updated in the current iteration round is referred to as an active node. According to a property that a core value of a node is determined by its neighbor node, a change of a core value of the active node may affect a core value of its neighbor node, so that the neighbor node is to be computed in the next iteration round. Therefore, the neighbor node of the active node in the current iteration round is stored in real time in WriteMessage.

The executor and the PS perform data processing in each iteration round in the following interaction manner.

(1) $minCore^{(t)}=minCore^{(t-1)}$ is initialized on the executor, and meanwhile, two vector spaces changedCore and keys2calc are created for the current iteration round to store nodes updated in the current iteration round and nodes to be computed in the next iteration round respectively.

(2) The nodes to be computed (directly referred to as computing nodes hereinafter) in the current iteration round are pulled from ReadMessage of the PS. All nodes are pulled in a first iteration.

(3) All nodes involved in computing (the computing nodes and their corresponding neighbors) in the current iteration round are determined according to the computing nodes obtained in step 2, and corresponding core values are pulled from coreness of the PS.

(4) For each node v in the computing nodes, an h-index value of a core value of its neighbor node is computed as a core value $C_v^{(t)}$ of this node in a new round. If $C_v^{(t)} < C_v^{(t-1)}$, $C_v^{(t)}$ is written to changedCore, the neighbor node, whose core value is greater than $minCore^{(t-1)}$, of the node v is written to keys2calc, and $minCore^{(t)}$ is determined, $minCore^{(t)}=min\ (minCore^{(t)}, C_v^{(t)})$.

(5) The coreness vector on the PS is updated with chagedCore, and the WriteMessage vector on the PS is updated with keys2calc.

Finally, after a round of iteration is completed for all partition data, on the PS, ReadMessage is replaced with WriteMessage, and WriteMessage is simultaneously reset to prepare for a next round of PS read-write. After all the data partitions are summarized to obtain global $minCore^{(t)}$, whether $minCore^{(t)} > minCore^{(t-1)}$ is true is determined. If YES, the above-mentioned compression pruning method is performed on all the data partitions.

According to the compression-based k-core mining method provided in this embodiment, the problems of high resource cost and high time consumption brought by k-core mining in a very-large-scale network can be resolved. According to the iteration characteristic of k-core mining, a real-time compression method is designed, and part of computing resources may be released as the iteration progresses. The k-core mining performance is improved by integrating the advantages of distributed parallel computing and standalone computing. The compression-based k-core mining method is implemented on the high-performance graph computing platform Spark on Angel to support a very-large-scale network with 10 billion/100 billion edges with low resource cost and high performance.

Figure 10:
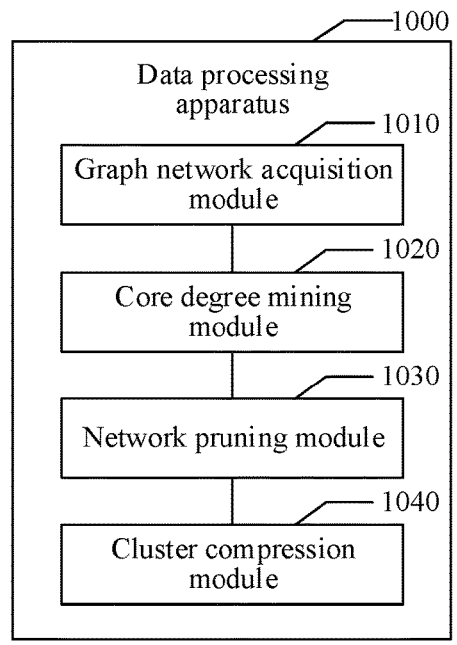
FIG. 10 schematically shows a structural block diagram of a data processing apparatus according to one embodiment.

The following describes apparatus embodiments of this application, which can be used for performing the data processing method in the foregoing embodiments of this application. FIG. 10 schematically shows a structural block diagram of a data processing apparatus according to one embodiment. As shown in FIG. 10, the data processing apparatus 1000 may mainly include: a graph network acquisition module 1010, configured to acquire a relationship graph network, the relationship graph network including nodes for representing interacting objects and edges for representing interactive relationships between multiple interacting objects: a core degree mining module 1020, configured to perform core degree mining on the relationship graph network through a device cluster including multiple computing devices, and update node core degrees of all or part of the nodes in the relationship graph network iteratively: a network pruning module 1030, configured to perform a pruning process on the relationship graph network according to the node core degrees to remove part of the nodes and edges in the relationship graph network; and a cluster compression module 1040, configured to perform, when a network scale of the relationship graph network satisfies a preset network compression condition, a compression process on the device cluster to remove part of the computing devices in the device cluster.

In some embodiments, based on each of the above embodiments, the cluster compression module 1040 includes: a standalone computing unit, configured to select a computing device from the device cluster as a target device for standalone computing of the relationship graph network, and remove the other computing devices except the target device from the device cluster.

In some embodiments, based on each of the above embodiments, the core degree mining module 1020 includes: a network partitioning unit, configured to perform a partitioning process on the relationship graph network to obtain a partition graph network including part of the nodes and edges in the relationship graph network: a network allocation unit, configured to allocate the partition graph network to the device cluster including the multiple computing devices, and determine a computing device for core degree mining of the partition graph network; and a partition mining unit, configured to perform core degree mining on the partition graph network through the allocated computing device, and update the node core degree of each node in the partition graph network iteratively.

In some embodiments, based on each of the above embodiments, the partition mining unit includes: a node selection subunit, configured to select a computing node for core degree mining in a current iteration round from the partition graph network, and determine a neighbor node adjacent to the computing node: a core degree acquisition subunit, configured to acquire current node core degrees of the computing node and the neighbor node in the current iteration round: a core degree computing subunit, configured to determine a temporary node core degree of the computing node according to the current node core degree of the neighbor node, determine whether the temporary node core degree of the computing node is less than the current node core degree of the computing node, and if YES, label the computing node as an active node; and a core degree updating subunit, configured to update the current node core degree of the active node according to the temporary node core degree, and determine the active node and a neighbor node adjacent to the active node as computing nodes for core degree mining in a next iteration round.

In some embodiments, based on each of the above embodiments, the core degree computing subunit includes: an h-index computing subunit, configured to determine an h-index of the computing node according to the current node core degree of the neighbor node, and determine the h-index as the temporary node core degree of the computing node, the h-index being used for representing that current node core degrees of at most h of all neighbor nodes of the computing node are greater than or equal to h.

In some embodiments, based on each of the above embodiments, the h-index computing subunit includes: a node sequencing subunit, configured to sequence all the neighbor nodes of the computing node from high to low current node core degrees, and allocate an arrangement sequence number to each neighbor node from 0; a node screening subunit, configured to compare the arrangement sequence number and current node core degree of each neighbor node, and screen out the neighbor node whose arrangement sequence number is greater than or equal to the current node core degree according to a comparison result; and an h-index determination subunit, configured to determine the current node core degree of the neighbor node with the minimum arrangement sequence number in the screened-out neighbor node as the h-index of the computing node.

In some embodiments, based on each of the above embodiments, the node selection subunit includes: an identifier reading subunit, configured to read a node identifier of a node to be updated from a first storage space, the node to be updated including an active node whose node core degree is updated in a previous iteration round and a neighbor node adjacent to the active node; and an identifier selection subunit, configured to select the computing node for core degree mining in the current iteration round from the partition graph network according to the node identifier of the node to be updated.

In some embodiments, based on each of the above embodiments, the data processing apparatus further includes: a core degree writing module, configured to write an updated current node core degree of the active node to a second storage space, the second storage space being used for storing the node core degrees of all the nodes in the relationship graph network: an identifier writing module, configured to acquire a node identifier of the active node and a node identifier of the neighbor node of the active node, and write the acquired node identifiers to a third storage space, the third storage space being used for storing a node identifier of a computing node for core degree mining in a next iteration round; and a space overwriting module, configured to overwrite, after core degree mining of all partition graph networks in the current iteration round, data in the first storage space with data in the third storage space, and reset the third storage space.

In some embodiments, based on each of the above embodiments, the core degree acquisition subunit includes: a core degree reading subunit, configured to read the current node core degrees of the computing node and the neighbor node in the current iteration round from a second storage space, the second storage space being used for storing the node core degrees of all the nodes in the relationship graph network.

In some embodiments, based on each of the above embodiments, the network pruning module 1030 includes: a minimum core degree acquisition unit, configured to acquire a minimum core degree of an active node in a current iteration round and a minimum core degree of the active node in a previous iteration round: a convergent node screening unit, configured to screen out a convergent node in the relationship graph network according to the minimum core degree of the active node in the previous iteration round when the minimum core degree of the active node in the current iteration round is greater than that of the active node in the previous iteration round, the convergent node being a node whose node core degree is less than or equal to the minimum core degree of the active node in the previous iteration round; and a convergent node removal unit, configured to remove the convergent node and an edge connected with the convergent node from the relationship graph network.

In some embodiments, based on each of the above embodiments, the network compression condition includes that a number of the edges in the relationship graph network is less than a preset number threshold.

In some embodiments, based on each of the above embodiments, the apparatus further includes a core degree initialization module, configured to acquire, for each node in the relationship graph network, a node number of neighbor nodes adjacent to the node, and initialize, for each node, the node core degree of the node according to the node number of the neighbor nodes adjacent to the node.

Embodiments consistent with this disclosure are also applicable to online payment or business transaction systems. For example, when using a payment application on the terminal device 110, the user may conduct a payment behavior or a collection behavior for another user on an online payment platform. Based on this process, the user may establish a transaction relationship with the other user, and in addition, corresponding transaction business data may be generated on the online payment platform.

Further, in some embodiments, after related user data such as social business data or transaction business data is collected, a graph network model may be constructed based on interactive relationships corresponding to the user data, and data mining is performed on the graph network model to obtain business attributes of users in the interactive relationships. Taking a transaction application scenario as an example, in a graph network model for reflecting transaction relationships between merchants and consumers, a node represents a merchant or consumer, and an edge represents that there is a transaction relationship between two nodes. Generally, a merchant node is mostly at a central position of the network. A core degree (core value) of the node may be input to a downstream machine learning task as a topological feature to implement a business model mining task to recognize whether the node in the graph network model is a merchant or a consumer. In addition, in risk control of payment transactions, data mining may be performed based on the graph network model to detect whether there is an unusual transaction behavior for a certain node (or edge), to execute detection tasks of unusual transaction behaviors such as illegal credit intermediation, cash-out, multi-platform loan, and gambling.

In the data processing method provided in this embodiment, a relationship graph network is established according to business data involving interactive relationships between interacting objects, and distributed computing may be performed first through a device cluster by use of a structural feature and sparsity of the relationship graph network for regional core degree mining. With the continuous iterative updating of node core degrees, a pruning process is performed on the relationship graph network to prune away nodes that have converged and corresponding connecting edges, to continuously compressing the relationship graph network with the iterative updating of the node core degrees and reducing the consumption of computing resources. Accordingly, a compression process may further be performed on the device cluster for core degree mining when the relationship graph network is compressed to a proper size. Therefore, not only may computing resources be released, but also the additional time cost in data distribution, etc., caused by parallel computing may be reduced, and the data processing efficiency may be improved.

Specific details about the data processing apparatus provided in each embodiment of this application have been described in the corresponding method embodiments, and elaborations are omitted herein.

Figure 11:
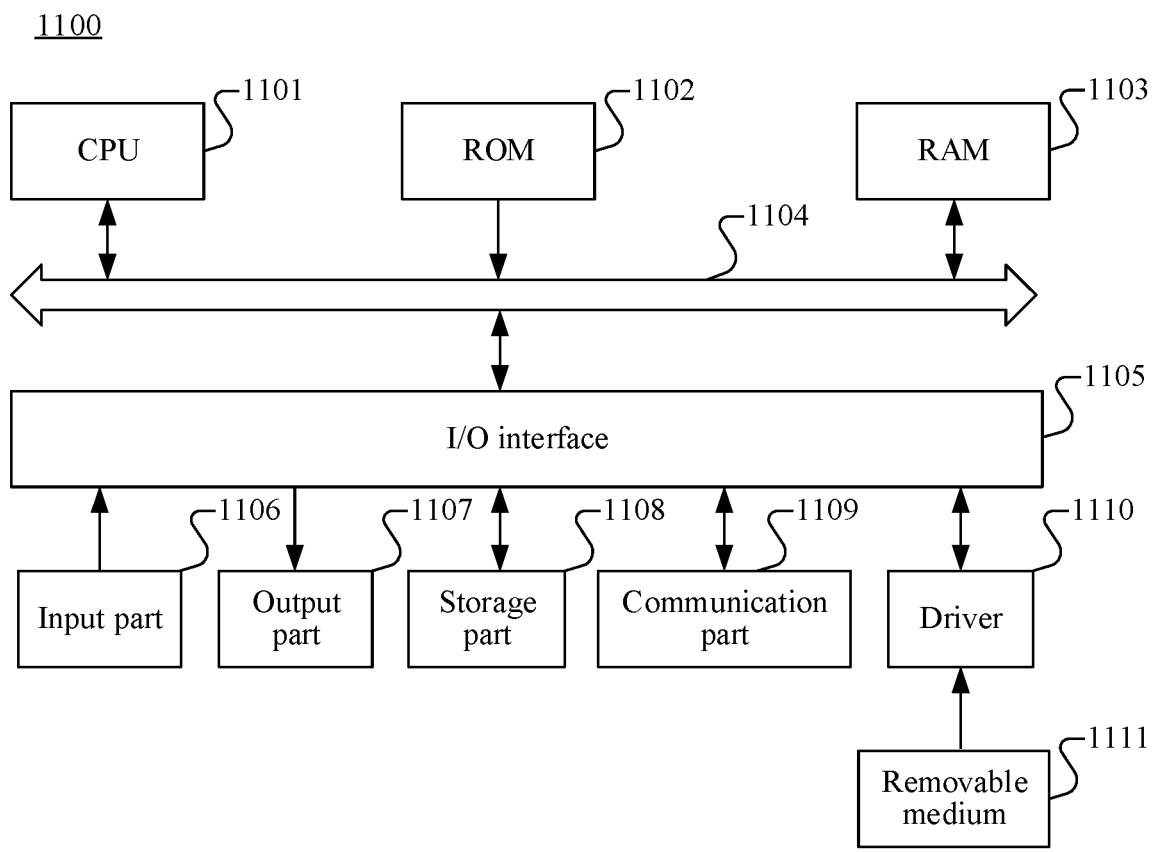
FIG. 11 schematically shows a structural block diagram of a computer system adapted to implement an electronic device according to one embodiment.

FIG. 11 schematically shows a structural block diagram of a computer system for implementing an electronic device according to one embodiment.

The computer system 1100 of the electronic device shown in FIG. 11 is merely an example, and does not constitute any limitation on functions and use ranges of some embodiments.

As shown in FIG. 11, the computer system 1100 includes a central processing unit (CPU). The CPU 801 may perform various appropriate actions and processing according to a program stored in a read-only memory (ROM) 1102 or a program loaded from a storage portion 1108 into a random access memory (RAM) 1103. The RAM 1103 further stores various programs and data required for operating the system. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard and a mouse, and the like: an output part 1107 including a cathode ray tube (CRT), a liquid crystal display (LCD), a speaker, or the like: a storage part 1108 including hard disk, or the like; and a communication part 1109 including a network interface card such as a local area network card, a modem, or the like. The communication part 1109 performs communication processing by using a network such as the Internet. A drive 1110 is also connected to the I/O interface 1105 as required. A removable medium 1111, such as a disk, an optical disc, a magneto-optical disc, or a semiconductor memory, is installed on the drive 1110 as required, so that a computer program read from the removable medium 1311 is installed in the storage part 1108 as required.

Particularly, according to one embodiment, the processes described in the method flowcharts may be implemented as computer software programs. For example, some embodiments include a computer program product, the computer program product includes a computer program carried on a computer-readable medium, and the computer program includes program code used for performing the methods shown in the flowcharts. In such an embodiment, the computer program may be downloaded and installed through the communication part 1109 from a network, and/or installed from the removable medium 1111. When the computer program is executed by the CPU 1101, the various functions defined in the system of this application are executed.

The computer-readable medium shown in some embodiments may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate or transmit a program that is used by or used in combination with an instruction execution system, apparatus or device. The program code included in the computer-readable medium may be transmitted using any suitable medium, including but not limited to a wireless medium, a wire medium, or the like, or any suitable combination thereof.

The flowcharts and block diagrams in the accompanying drawings illustrate various system architectures, functions, and operations that may be implemented by a system, a method, and a computer program product according to various embodiments of this application. In this regard, each box in the flowchart or the block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, the technical solutions of some embodiments may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to some embodiments.

Other embodiments of this application will be apparent to a person skilled in the art from consideration of the specification and practice of the disclosure here. This application is intended to cover any variation, use, or adaptive change of this application. These variations, uses, or adaptive changes follow the general principles of this application and include common general knowledge or common technical means in the art that are not disclosed in this application.

It is to be understood that this application is not limited to the precise structures described above and shown in the accompanying drawings, and various modifications and changes can be made without departing from the scope of this application. The scope of this application is limited by the appended claims only.

What is claimed is:

1. A computer implemented data processing method, the method comprising:
   acquiring a relationship graph network, the relationship graph network comprising nodes for representing interacting objects and edges for representing interactive relationships between multiple interacting objects;
   partitioning the relationship graph network to obtain a first number of partition graph networks, wherein a partition graph network includes part of the nodes and edges in the relationship graph network;
   performing, based on the first number of partition graph networks, core degree mining on the relationship graph network in a distributed computing mode through a device cluster comprising multiple computing devices, and iteratively updating node core degrees of all or some of the nodes in the relationship graph network, each computing device in the device cluster being configured to perform computing tasks of the core degree mining on the relationship graph network;
   pruning the relationship graph network according to the node core degrees to remove some of the nodes and edges in the relationship graph network; and
   compressing the device cluster to remove some of the computing devices in the device cluster, when a network scale of the relationship graph network corresponding to the first number of the partitioned graph networks meets a network compression condition, comprising:
      repartitioning, according to the network scale, the relationship graph network to obtain a second number of partition graph networks, the second number being smaller than the first number;
      invoking one or more computing devices in the multiple computing devices based on the second number of partition graph networks; and
      in response to the network scale being reduced to satisfy a specified condition, transforming from the distributed computing mode to a standalone computing mode by: selecting a single computing device from the device cluster as a target device for standalone computing of the relationship graph network, and removing the other computing devices except the target device from the device cluster, wherein the target device has a computing capability to perform the computing tasks of the core degree mining on the relationship graph network with the reduced network scale.

2. The computer implemented data processing method according to claim 1, wherein the performing core degree mining on the relationship graph network through a device cluster comprising multiple computing devices and iteratively updating node core degrees of the respective nodes in the relationship graph network comprises:
   allocating the first number of partition graph networks to the device cluster comprising the multiple computing devices, and determining a computing device for core degree mining of the first number of partition graph networks; and
   performing core degree mining on the first number of partition graph networks through the allocated computing device, and iteratively updating the node core degree of each node in the first number of partition graph networks.

3. The computer implemented data processing method according to claim 2, wherein the performing core degree mining on the first number of partition graph networks and updating the node core degree of each node in the first number of partition graph networks iteratively comprises:
   selecting a computing node for core degree mining in a current iteration from the first number of partition graph networks, and identifying a neighbor node adjacent to the computing node;
   acquiring current node core degrees of the computing node and the neighbor node in the current iteration;
   determining a temporary node core degree of the computing node according to the current node core degree of the neighbor node, determining the temporary node core degree of the computing node is less than the current node core degree of the computing node, and labeling the computing node as an active node; and
   updating the current node core degree of the active node according to the temporary node core degree, and determining the active node and a neighbor node adjacent to the active node as computing nodes for core degree mining in a next iteration.

4. The computer implemented data processing method according to claim 3, wherein the determining a temporary node core degree of the computing node according to the current node core degree of the neighbor node comprises:

determining an h-index of the computing node according to the current node core degree of the neighbor node, and determining the h-index as the temporary node core degree of the computing node, the h-index representing that current node core degrees of at most h of all neighbor nodes of the computing node are greater than or equal to h.

5. The computer implemented data processing method according to claim 4, wherein the determining an h-index of the computing node according to the current node core degree of the neighbor node comprises:
sequencing all the neighbor nodes of the computing node from high to low current node core degrees, and allocating an arrangement sequence number to each neighbor node from 0;
comparing the arrangement sequence number and current node core degree of each neighbor node, and screening out the neighbor node whose arrangement sequence number is greater than or equal to the current node core degree according to a comparison result; and
determining the current node core degree of the neighbor node with the minimum arrangement sequence number in the screened-out neighbor node as the h-index of the computing node.

6. The computer implemented data processing method according to claim 3, wherein the selecting a computing node for core degree mining in a current iteration from the first number of partition graph networks comprises:
reading a node identifier of a node to be updated from a first storage space, the node to be updated comprising an active node whose node core degree is updated in a previous iteration and a neighbor node adjacent to the active node; and
selecting the computing node for core degree mining in the current iteration from the first number of partition graph networks according to the node identifier of the node to be updated.

7. The computer implemented data processing method according to claim 6, further comprising:
writing an updated current node core degree of the active node to a second storage space, the second storage space storing the node core degrees of all the nodes in the relationship graph network;
acquiring a node identifier of the active node and a node identifier of the neighbor node of the active node, and writing the acquired node identifiers to a third storage space, the third storage space storing a node identifier of a computing node for core degree mining in a next iteration; and
overwriting, after core degree mining of all partition graph networks in the current iteration, data in the first storage space with data in the third storage space, and resetting the third storage space.

8. The computer implemented data processing method according to claim 3, wherein the acquiring current node core degrees of the computing node and the neighbor node in the current iteration comprises:
reading the current node core degrees of the computing node and the neighbor node in the current iteration from a second storage space, the second storage space storing the node core degrees of all the nodes in the relationship graph network.

9. The computer implemented data processing method according to claim 1, wherein the performing a pruning process on the relationship graph network according to the node core degrees to remove some of the nodes and edges in the relationship graph network comprises:

acquiring a minimum core degree of an active node in a current iteration and a minimum core degree of the active node in a previous iteration;
identifying a convergent node in the relationship graph network according to the minimum core degree of the active node in the previous iteration when the minimum core degree of the active node in the current iteration is greater than that of the active node in the previous iteration, the convergent node being a node whose node core degree is less than or equal to the minimum core degree of the active node in the previous iteration; and
removing the convergent node and an edge connected with the convergent node from the relationship graph network.

10. The computer implemented data processing method according to claim 1, wherein the network compression condition comprises that a number of the edges in the relationship graph network is less than a number threshold.

11. The computer implemented data processing method according to claim 1, further comprising:
acquiring, for each node in the relationship graph network, a node number of neighbor nodes adjacent to the node; and
initializing, for each node, the node core degree of the node according to the node number of the neighbor nodes adjacent to the node.

12. The method according to claim 1, wherein partitioning the relationship graph network comprises:
selecting multiple partitioning center points from the relationship graph network according to a preset partition number;
performing a clustering process on one or more nodes in the relationship graph network to obtain partitioning center points as clustering centers for allocating the one or more nodes to a respective closest partitioning center point; and
partitioning the relationship graph network into one or more partition graph networks according to a clustering result of the nodes.

13. The method according to claim 12, wherein the partitioning center points include a node selected according to a preset rule.

14. The method according to claim 1, further comprising:
in the single computing mode, processing the whole relationship graph network serially by centralized computing on the target computing device.

15. A non-transitory computer-readable storage medium, storing a computer program, the computer program, when executed by a processor, causing the processor to perform:
acquiring a relationship graph network, the relationship graph network comprising nodes for representing interacting objects and edges for representing interactive relationships between multiple interacting objects;
partitioning the relationship graph network to obtain a first number of partition graph networks, wherein a partition graph network includes part of the nodes and edges in the relationship graph network;
performing, based on the first number of partition graph networks, core degree mining on the relationship graph network in a distributed computing mode through a device cluster comprising multiple computing devices, and iteratively updating node core degrees of all or some of the nodes in the relationship graph network, each computing device in the device cluster being configured to perform computing tasks of the core degree mining on the relationship graph network;

pruning the relationship graph network according to the node core degrees to remove some of the nodes and edges in the relationship graph network; and compressing the device cluster to remove some of the computing devices in the device cluster, when a network scale of the relationship graph network corresponding to the first number of the partitioned graph networks meets a network compression condition, comprising:

repartitioning, according to the network scale, the relationship graph network to obtain a second number of partition graph networks, the second number being smaller than the first number;

invoking one or more computing devices in the multiple computing devices based on the second number of partition graph networks; and in response to the network scale being reduced to satisfy a specified condition, transforming from a distributed computing mode to a standalone computing mode by: selecting a single computing device from the device cluster as a target device for standalone computing of the relationship graph network, and removing the other computing devices except the target device from the device cluster, wherein the target device has a computing capability to perform the computing tasks of the core degree mining on the relationship graph network with the reduced network scale.

16. The computer-readable storage medium according to claim 15, wherein the performing core degree mining on the relationship graph network through a device cluster comprising multiple computing devices and iteratively updating node core degrees of the respective nodes in the relationship graph network comprises:

allocating the first number of partition graph networks to the device cluster comprising the multiple computing devices, and determining a computing device for core degree mining of the first number of partition graph networks; and performing core degree mining on the first number of partition graph networks through the allocated computing device, and iteratively updating the node core degree of each node in the first number of partition graph networks.

17. The computer-readable storage medium according to claim 16, wherein the performing core degree mining on the first number of partition graph networks and updating the node core degree of each node in the first number of partition graph networks iteratively comprises:

selecting a computing node for core degree mining in a current iteration from the first number of partition graph networks, and identifying a neighbor node adjacent to the computing node;

acquiring current node core degrees of the computing node and the neighbor node in the current iteration;

determining a temporary node core degree of the computing node according to the current node core degree of the neighbor node, determining the temporary node core degree of the computing node is less than the current node core degree of the computing node, and labeling the computing node as an active node; and updating the current node core degree of the active node according to the temporary node core degree, and determining the active node and a neighbor node adjacent to the active node as computing nodes for core degree mining in a next iteration.

18. The computer-readable storage medium according to claim 17, wherein the determining a temporary node core degree of the computing node according to the current node core degree of the neighbor node comprises:

determining an h-index of the computing node according to the current node core degree of the neighbor node, and determining the h-index as the temporary node core degree of the computing node, the h-index representing that current node core degrees of at most h of all neighbor nodes of the computing node are greater than or equal to h.

19. An electronic device, comprising:

a processor; and a memory, configured to store executable instructions of the processor, the processor being configured to execute the executable instructions and perform:

acquiring a relationship graph network, the relationship graph network comprising nodes for representing interacting objects and edges for representing interactive relationships between multiple interacting objects;

partitioning the relationship graph network to obtain a first number of partition graph networks, wherein a partition graph network includes part of the nodes and edges in the relationship graph network;

performing, based on the first number of partition graph networks, core degree mining on the relationship graph network in a distributed computing mode through a device cluster comprising multiple computing devices, and iteratively updating node core degrees of all or some of the nodes in the relationship graph network, each computing device in the device cluster being configured to perform computing tasks of the core degree mining on the relationship graph network;

pruning the relationship graph network according to the node core degrees to remove some of the nodes and edges in the relationship graph network; and compressing the device cluster to remove some of the computing devices in the device corresponding to the first number of the partitioned graph networks meets a network compression condition, comprising:

repartitioning, according to the network scale, the relationship graph network to obtain a second number of partition graph networks, the second number being smaller than the first number;

invoking one or more computing devices in the multiple computing devices based on the second number of partition graph networks; and in response to the network scale being reduced to satisfy a specified condition, transforming from a distributed computing mode to a standalone computing mode by: selecting a single computing device from the device cluster as a target device for standalone computing of the relationship graph network, and removing the other computing devices except the target device from the device cluster, wherein the target device has a computing capability to perform the computing tasks of the core degree mining on the relationship graph network with the reduced network scale.

* * * * *